United States Patent [19]

Shoda et al.

[11] Patent Number: 5,477,333
[45] Date of Patent: Dec. 19, 1995

[54] DISPLACEMENT DETECTING APPARATUS

[75] Inventors: Yoshio Shoda; Narimasa Takeda, both of Tokyo, Japan

[73] Assignee: Sony Magnescale Inc., Tokyo, Japan

[21] Appl. No.: 319,105

[22] Filed: Oct. 6, 1994

[30] Foreign Application Priority Data

Oct. 8, 1993 [JP] Japan .................................. 5-253174

[51] Int. Cl.⁶ .................................................. G01B 11/14
[52] U.S. Cl. ........................................ 356/373; 250/201.3
[58] Field of Search ..................................... 356/373, 371, 356/237, 445, 399, 400; 250/201.2, 201.3, 201.5; 369/44.14, 44.19, 44.23

[56] References Cited

U.S. PATENT DOCUMENTS

| | | | |
|---|---|---|---|
| 4,148,587 | 4/1979 | Erdmann et al. | 250/201.3 |
| 5,220,550 | 6/1993 | Nakayama et al. | 369/44.17 |
| 5,247,165 | 9/1993 | Hiruta et al. | 250/201.3 |

Primary Examiner—Hoa Q. Pham
Attorney, Agent, or Firm—Foley & Lardner

[57] ABSTRACT

A displacement detecting apparatus for detecting a displacement between an object lens thereof and a measured surface in a non-contact manner. The displacement detecting apparatus comprises an object lens for focusing laser beam on the measured surface. A detecting optical system is provided to detect a focus error signal which represents a difference between a distance of the object lens from the measured surface and a focal distance of the object lens, in accordance with a reflected light from the measured surface. An actuator is provided to move the object lens in an optical axis in a manner to cause the object lens distance to coincide with the focal distance, in accordance with an output signal from the detecting optical system. A moving body includes a linear scale or a scale head and movable with the object lens. The linear scale is disposed coaxially with the optical axis and connected to the actuator. A support member is provided to movably support the moving body. Additionally, a balance weight is connected to the moving body in a manner that the center of gravity of the moving body coincides with the center of driving force of said actuator and with the center of support of the support member.

5 Claims, 9 Drawing Sheets

DISPLACEMENT DETECTING APPARATUS

BACKGROUND OF THE INVENTION

1. Field of the Invention

This invention relates to improvements in a displacement detecting apparatus, and more particularly to a displacement detecting apparatus for detecting a displacement between an object lens and a measured surface in a non-contact manner by using an optical astigmatism method.

2. Description of the Prior Art

A variety of methods such as an optical astigmatism method, a critical angle detecting method and a knife-edge method have been proposed and put into practical use to measure the displacement between an object lens and a measured surface, the shape of an object, and the surface roughness of the object. Such methods are accomplished, for example, with a non-contact type surface roughness tester which is arranged to measure a displacement in accordance with an absolute level of a focus error signal, and a focus-adjusting type non-contact displacement detecting apparatus which is provided at its object lens with a driving system as a mover and arranged to cause the object lens to follow the measured surface under feedback-control of a focus error signal, and then to detect a displacement between the object lens and the measured surface in accordance with a signal from the driving system as the mover.

The above-discussed displacement detecting apparatuses are adapted to measure the surface roughness or a fine contour of the measured surface. During a measurement operation of such apparatuses, the upper limit of a measuring speed for the measured surface is decided by a frequency response of the mover of the apparatus, and therefore raising the resonance frequency of the mover is required. In order to raise the resonance frequency of the mover, it is effective to minimize the longitudinal dimension of the mover, to shape the mover so as to have a high rigidity, to form the mover of a material having a high modulus of longitudinal elasticity and to raise the rigidity of a support member for the mover.

Furthermore, the above-discussed displacement detecting apparatuses are used to measure the fine deformation and surface roughness of a base plate or the like, and therefore they are required to be small in size. In this regard, the mover for moving the object lens during detection of the displacement is not always disposed symmetrically relative to a moving direction of the object lens.

Difficulties have been encountered in the above-discussed conventional displacement detecting apparatuses, in which the center of gravity of the mover, the center of driving force and the support center of the mover do not coincide with each other in a plane perpendicular to the displacement direction of the mover, thereby generating a moment around a support point for the mover. As a result, a lateral vibration is generated in the mover relative to the longitudinal direction of the mover, thereby lowering the resonance frequency of the mover. This will lower the maximum measuring speed of the displacement detecting apparatus to the measured surface.

SUMMARY OF THE INVENTION

It is an object of the present invention to provide an improved displacement detecting apparatus which can effectively overcome drawbacks encountered in conventional displacement detecting apparatuses.

Another object of the present invention is to provide an improved displacement detecting apparatus which can effectively prevent a moment from being generated owing to movement of a moving body or mover during detection of the displacement.

A further object of the present invention is to provide an improved displacement detecting apparatus by which a moving body or mover is effectively prevented from generating a lateral vibration relative to the longitudinal direction thereof, thereby largely improving a servo characteristics or response frequency characteristics.

A displacement detecting apparatus according to the present invention comprises an object lens system for focusing laser beam on a measured surface of an object. A detecting optical system is provided to detect a focus error signal which represents a difference between a distance of the object lens system from the measured surface and a focal distance of the object lens system, in accordance with a reflected light from the measured surface, the detecting optical system producing an output signal representative of the difference. An actuator is provided to move the object lens system in the direction of an optical axis of the object lens system in a manner to cause the object lens system distance to coincide with the focal distance, in accordance with the output signal from the detecting optical system. A linear scale is disposed coaxially with the optical axis and connected to the actuator. A moving body includes the scale or a scale head, the moving body being movable with the object lens system. A support member is provided to support the moving body. Additionally, an arrangement is so made as to cause the center of gravity of the moving body, the center of driving force of the actuator and the center of support of the support member to coincide with each other.

According to the above arrangement, the center of gravity of the moving body, the center of the driving force of the actuator and the center of support of the support member coincide with each other, and therefore no moment is developed around the center of support. As a result, the moving body can be effectively prevented from generation of lateral vibration relative to the longitudinal direction thereof, thereby largely improving a servo characteristics or response frequency characteristics of the apparatus while accomplishing small-sizing the apparatus and minimizing a consumed electric power. This effectively suppresses the heat generation at a low level and improves the stability of the apparatus to temperature thereby making possible to achieve a high precision measurement of an order of $1/100$ micron.

BRIEF DESCRIPTION OF THE DRAWINGS

In the drawings, like reference numerals designate like parts and elements throughout all figures, in which.

DETAILED DESCRIPTION OF THE INVENTION

Figure 1A:
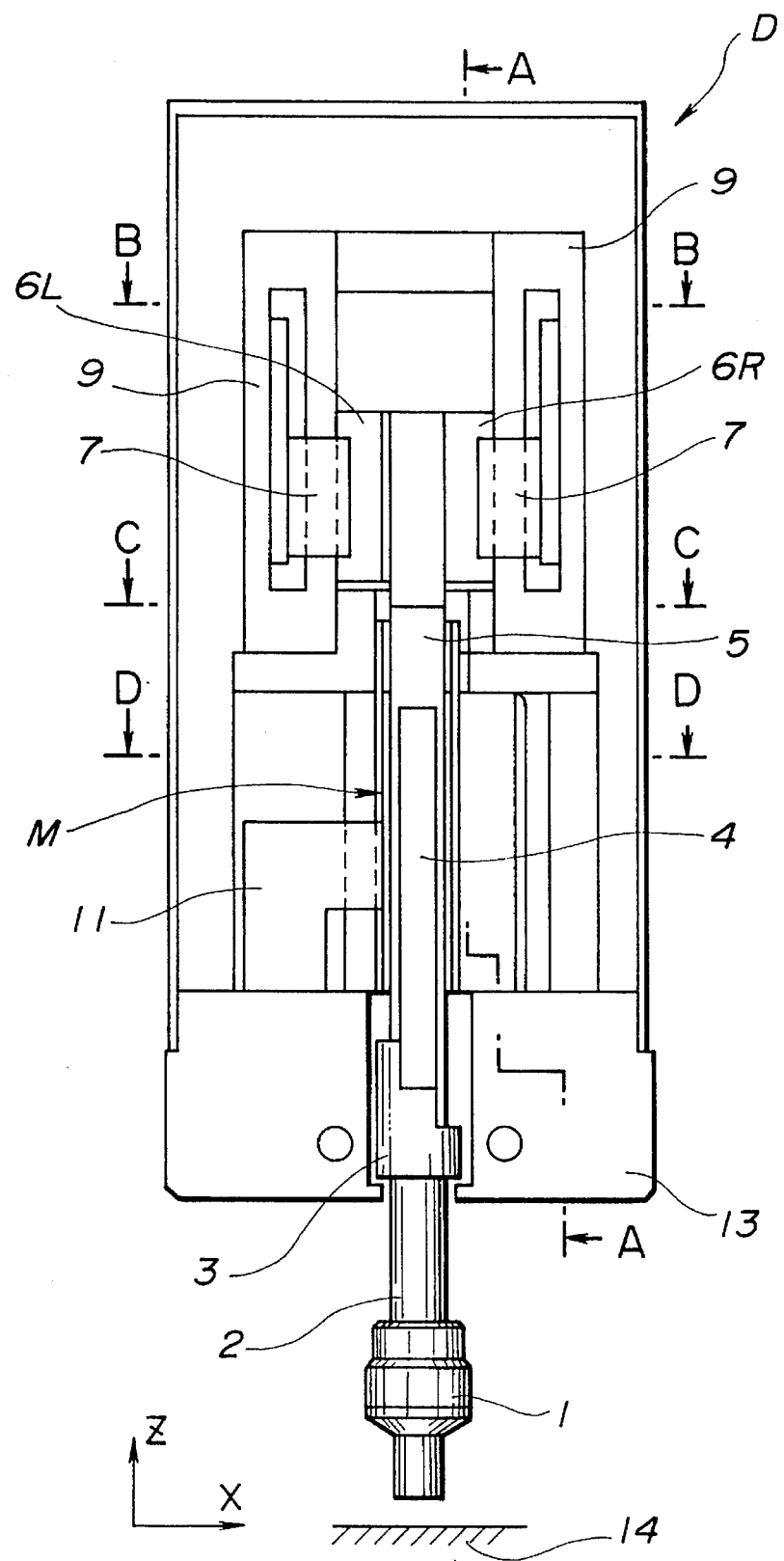
FIGS. 1(a),(b) are plan views of an embodiment of a displacement detecting apparatus according to the present invention.
Figure 1B:
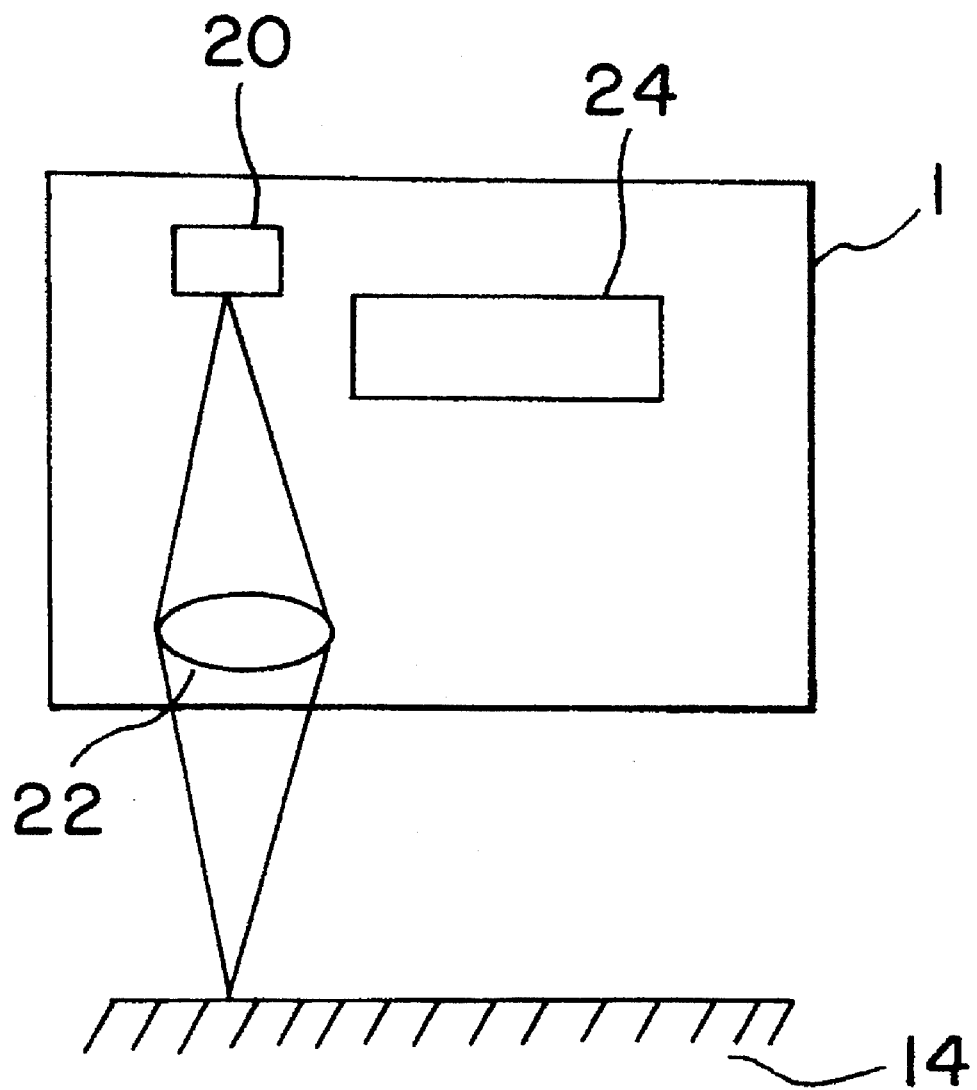

Referring now to FIGS. 1(a),(b) to 6 of the drawings, an embodiment of a displacement detecting apparatus of the present invention is illustrated by the character D. The displacement detecting apparatus D comprises a focus error signal detecting system 1 including a laser diode 20 and an object lens 22, as shown in FIG. 1(b). The laser diode 20 is adapted to generate laser beam which is to be focused on a measured surface 14 of an object by the object glens. The object lens is installed at the tip end section of the detecting system 1. The focus error signal detecting system further includes a light-intercepting element 24 for receiving a reflected light from the measured surface 14, though not shown. The focus error signal detecting system 1 functions to detect a focus error signal (in the form of the reflected light) under the action of the light-intercepting element. The focus error signal is generated in accordance with the reflected light from the measured surface 14 and represents a difference between a (object lens) distance of the object lens from the measured surface 14 and a focal distance of the object lens.

Figure 3:
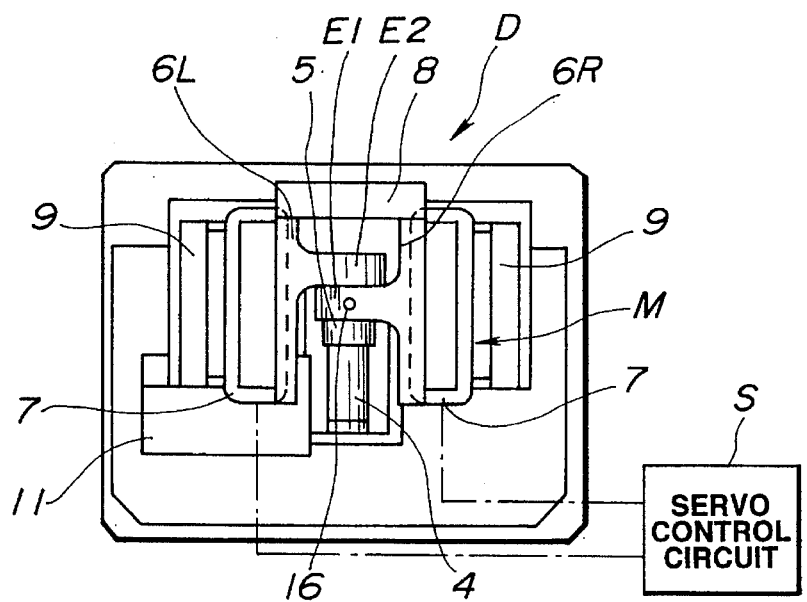
FIG. 3 is a cross-sectional view taken in file direction of the arrows substantially along the line B—B of FIG. 1(a)
Figure 4:
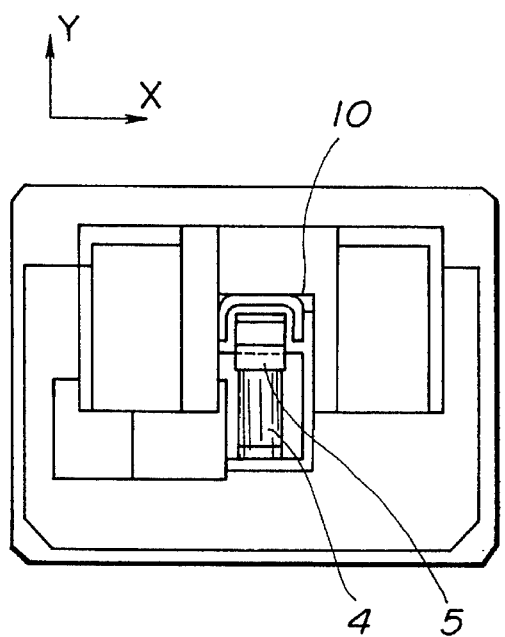
FIG. 4 is a cross-sectional view taken in the direction of the arrows substantially along the line C—C of FIG. 1(a)
Figure 5:
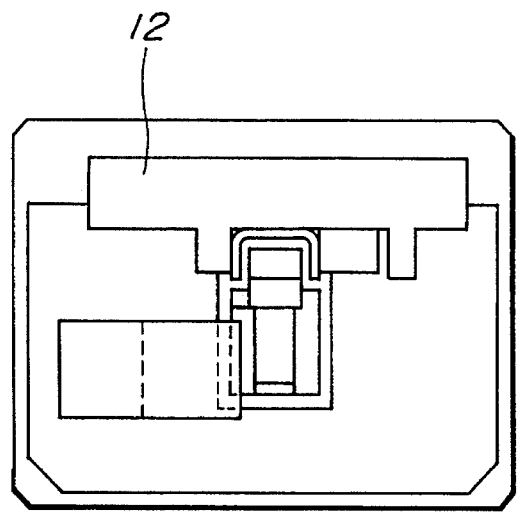
FIG. 5 is a cross-sectional view taken in the direction of the arrows substantially along the line D—D of FIG. 1(a)

A spindle 2 is provided between the focus error signal detecting system 1 and a scale 4. The spindle 2 is formed of a low expansibility material, and elongate and hollow so that a hollow (not shown) extends longitudinally. The spindle 2 has a first end section connected to the focus error signal detecting system 1. The second end section of the spindle 2 is connected through a spindle joint 3 to the scale 4. A lead wire or cable is disposed inside the hollow of the spindle 2 and electrically connecting the focus error signal detecting system 1 and a servo control circuit S shown in FIG. 3.

The scale 4 is a linear scale and has scale marks at intervals of a predetermined distance in a longitudinal direction thereof. The scale 4 is adapted to measure a distance between the object lens of the focus error signal detecting system 1 and the measured surface 14 of the object, in association with a scale head 11, under a relative displacement between the scale 4 and the scale head 11.

A lift bar 5 is elongate and generally plate-shaped. The lift bar 5 has a first end section formed with an upper surface on which the scale 4 is fixedly secured. A bobbin 6R is fixedly connected to a second end section of the lift bar 5. More specifically, the bobbin 6R is generally T-shaped in cross-section and has a centrally located and laterally extending portion E1 which is fixedly secured at its first surface to the lower surface of the second end section of the lift bar 5. Additionally, a bobbin 6L is similar in shape to the bobbin 6R and located opposite to and parallel with the bobbin 6R. The bobbin 6L has a centrally located and laterally extending portion E2 which is secured at its first surface with the second surface of the extending portion E1. A coil 7 is wound or disposed on a core portion of each bobbin 6R, 6L. A balance weight 8 is fixedly secured to extreme ends of vertically extending base portions of the bobbins 6R, 6L.

The above-discussed focus error signal detecting system 1, spindle 2, spindle joint 3, scale 4, lift bar 5, bobbin 6R, bobbin 6L, coil 7 and balance weight 8 are fixedly secured to each other to form a one-piece structure which can move as a single member. Thus, this one-piece structure is referred hereinafter to as a moving body M.

An actuator 9 is provided to move the moving body M, and includes a voice coil motor (not shown). The actuator 9 has such a characteristic as to make its linear displacement in accordance with an electric current flowing through the coil 7. Consequently, the actuator 9 is adapted to be able to displace the moving body M in a direction Z opposite to the measured surface 14 or in a direction far from the measured surface 14. It will be understood that the actuator 9 may be replaced with a servo motor which has a characteristics similar to that of the actuator 9.

A support member 10 is provided to movably support the moving body M, and includes, for example, a linear bearing and the like. The support member 10 is so adapted that the moving body M is slidably movable thereon in its longitudinal direction. The support member 10 is fixedly secured to a base 12 forming part of a chassis (not identified) of the displacement detecting apparatus D. The scale head 11 is fixedly secured to a stem 13 forming part of the chassis and adapted to measure the relative movement between it and the scale 4 so as to determine the distance between the object lens and the measured surface 14. It will be understood that the scale head 11 may be fixedly secured to the spindle 2 through the spindle joint 3, in which the scale 4 is fixedly secured to the chassis. The above-discussed actuator 9, support member 10, scale head 11, base 12, and stem 13 serves as stationary bodies, respectively, and therefore make their relative movement to the moving body M.

The focus error signal detecting system 1, the coil 7 and the servo control circuit S constitute a closed-loop servo system (not identified) which serves as a focus adjusting type non-contact detecting device which is disclosed in a pending Japanese Patent Application No. 3-141836. The focus adjusting type non-contact detecting device is arranged as follows: The focus error signal detecting system 1 detects a difference between a focal distance of the object lens and the distance between the object lens and the measured surface 14. Then, the servo control circuit S controls the coil 7 in such a manner that the actuator 9 moves and locates the moving body M at a position to focus the object lens on the measured surface 14. In other words, the moving body M is located so as to cause the distance between the object lens (disposed at the tip end section of the focus error signal detecting system 1) and the measured surface 14 to coincide with the focal distance of the object lens.

Figure 2:
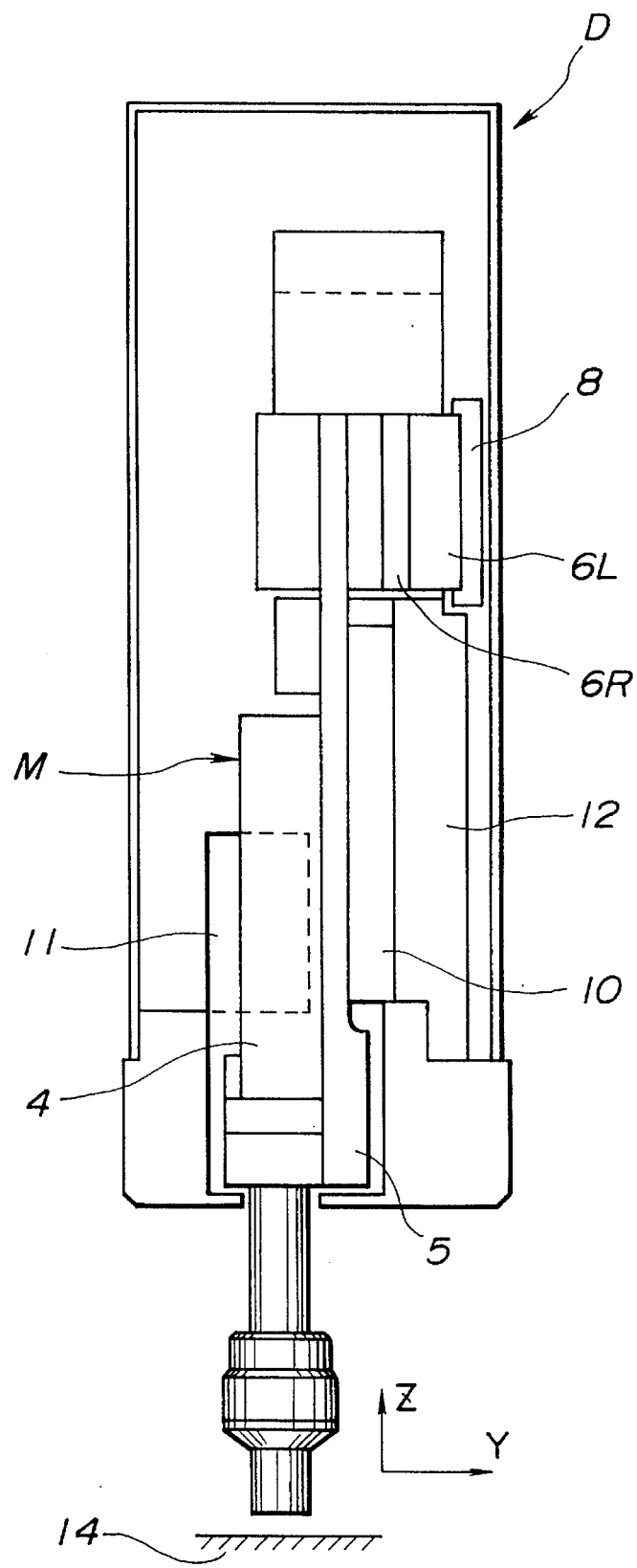
FIG. 2 is a cross-sectional view taken in the direction of the arrows substantially along the line A—A of FIG. 1(a)

In the above-discussed embodiment, two actuators 9, 9 are provided as shown. The center of combined driving forces of the two actuators 9, 9 is determined. This center corresponds to a combined center of the two coils 7, 7 of the two actuators 9, 9. As clearly shown in FIG. 3, the support member 10 is arranged in such a manner that this combined center as the center of the combined driving forces coincides with the center of Support of the support member 10 at a position indicated by the reference numeral 16 in FIG. 3. Furthermore, the weight of the balance weight 8 is suitably adjusted to cause the center of gravity of the whole moving body M to coincide with the center of support of the support member 10 and with the center of the combined driving forces of the actuators 9, 9. As a result, when the actuator 9 moves and locates the whole moving body M in the direction opposite to the measured surface 14, a moment around the support center of the support member 10 can be prevented from being produced. This effectively improves a response speed during locating the moving body M, or a response frequency characteristic of the displacement detecting apparatus D. The reference character X in FIGS. 1 and 2 represents a direction in which the essential part (shown in FIGS. 1 and 2) of the displacement detecting apparatus D can move to make a continuous detection for the measured surface 14.

FIGS. 7 to 10 illustrate another embodiment of the displacement detecting apparatus D according to the present invention, similar to the above embodiment of FIGS. 1 to 6 with the exception that two support members 10 are provided in such a manner that the moving body M is put between them.

Figure 9:
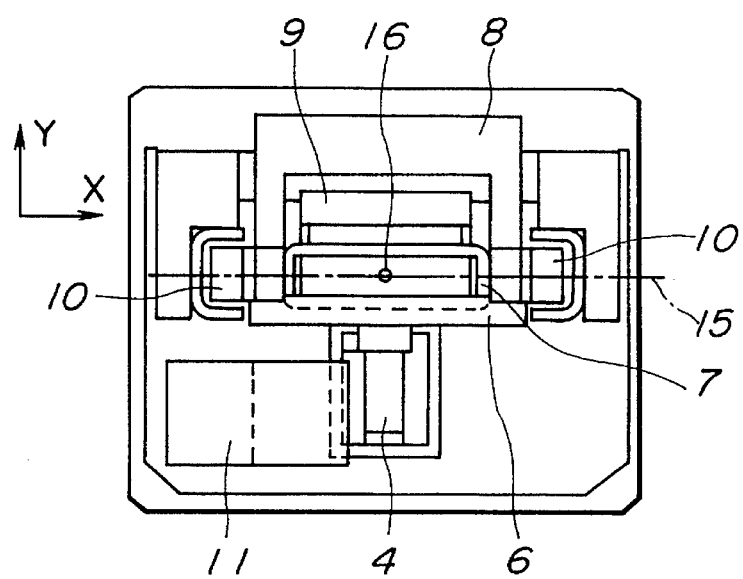
FIG. 9 is a cross-sectional view taken in the direction of arrows substantially along the line B'—B' of FIG. 8.
Figure 6:
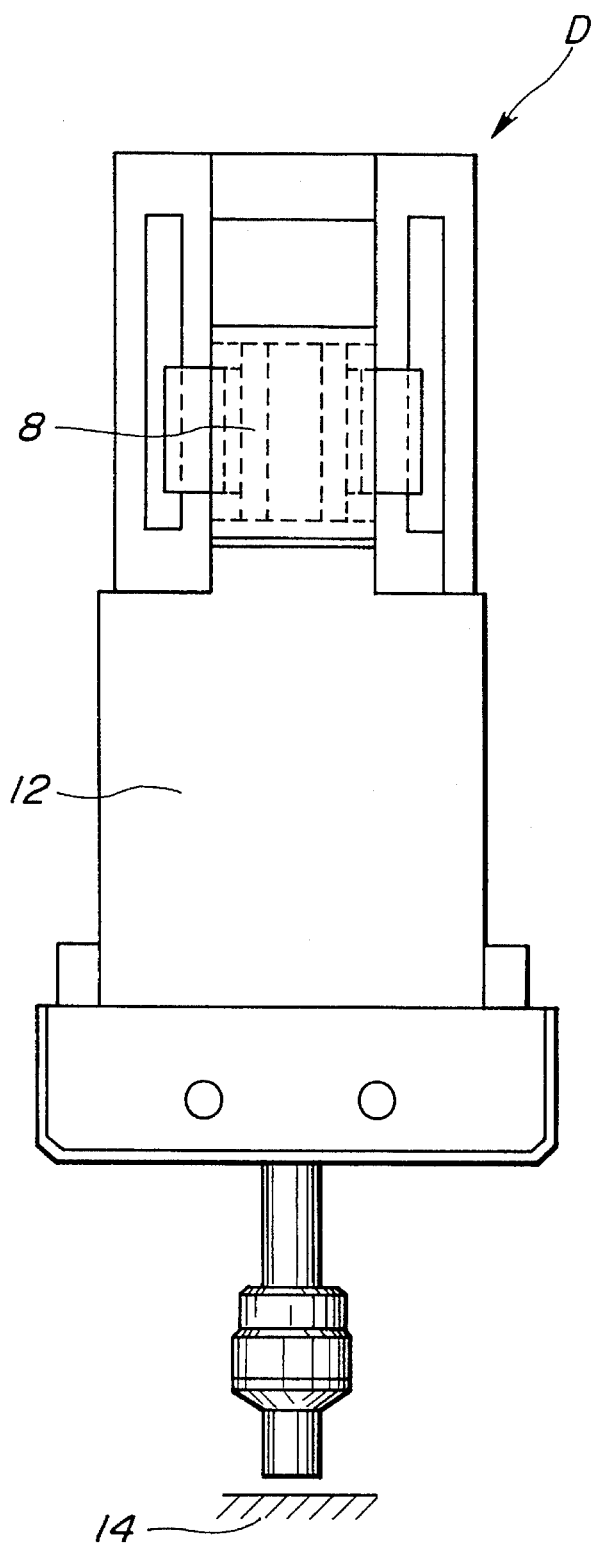
FIG. 6 is a bottom view of the displacement detecting apparatus of FIG. 1(a)
Figure 7:
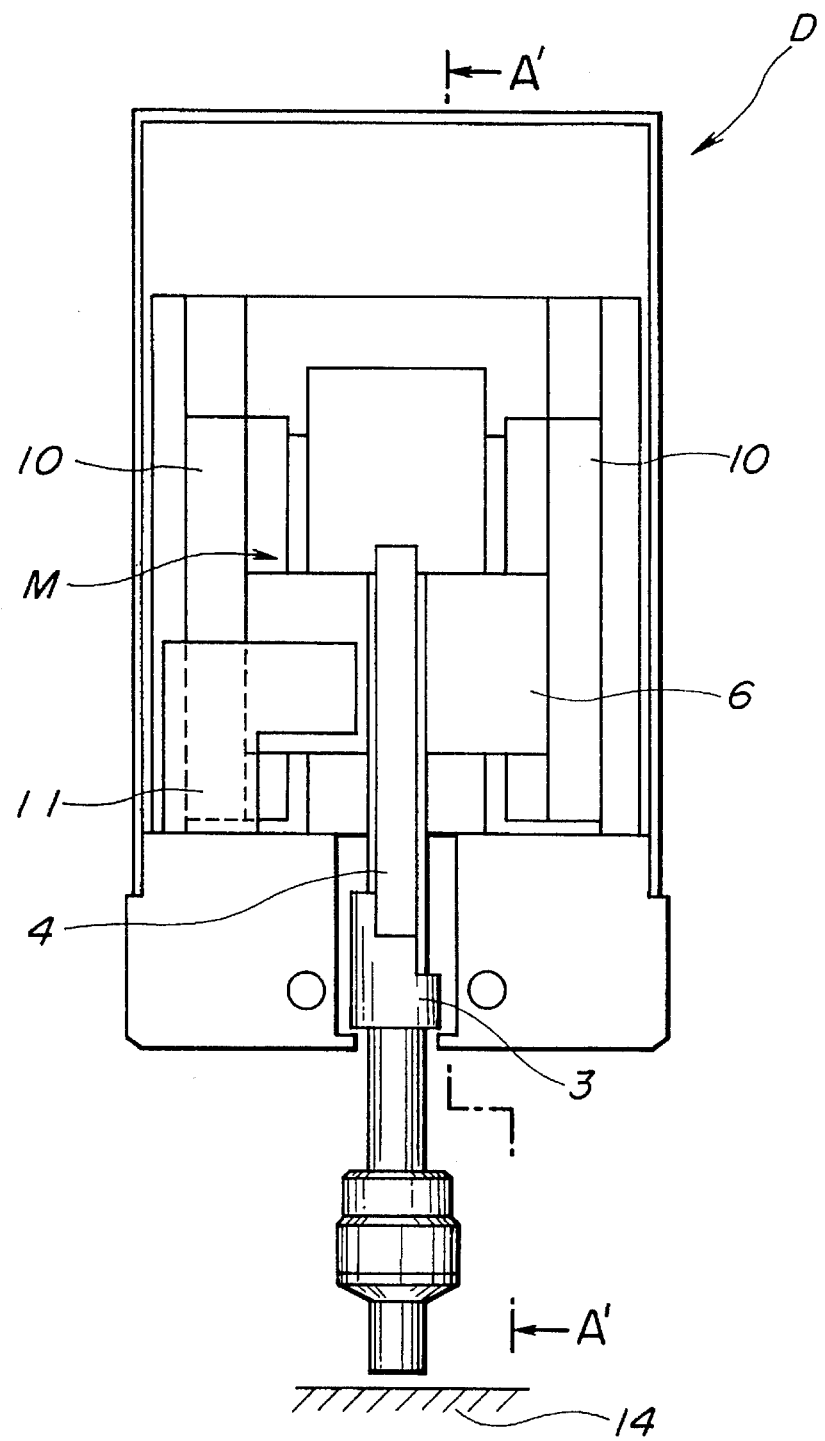
FIG. 7 is a plan view of another embodiment of the displacement detecting apparatus according to the present invention.
Figure 8:
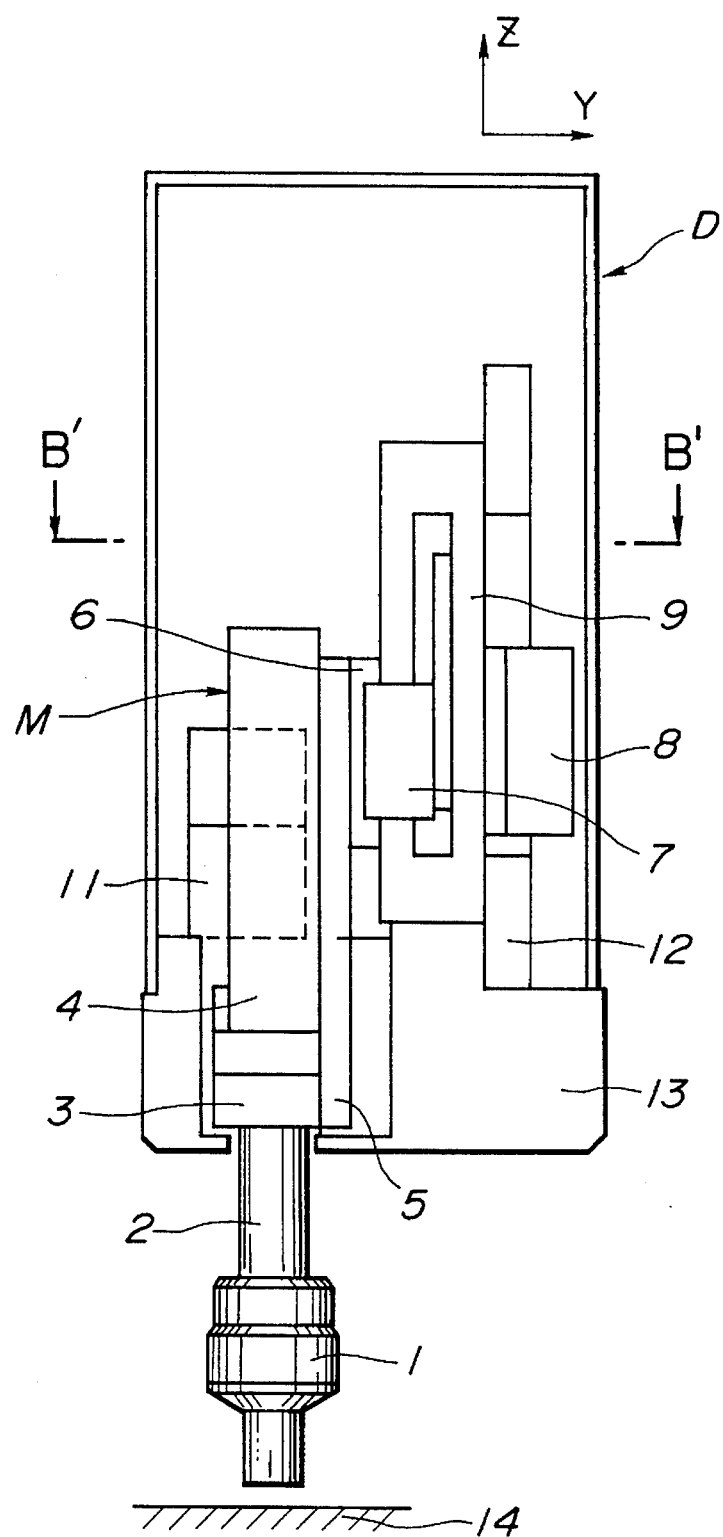
FIG. 8 is a cross-sectional view taken in the direction of arrows substantially along the line A'—A' of FIG. 7.
Figure 10:
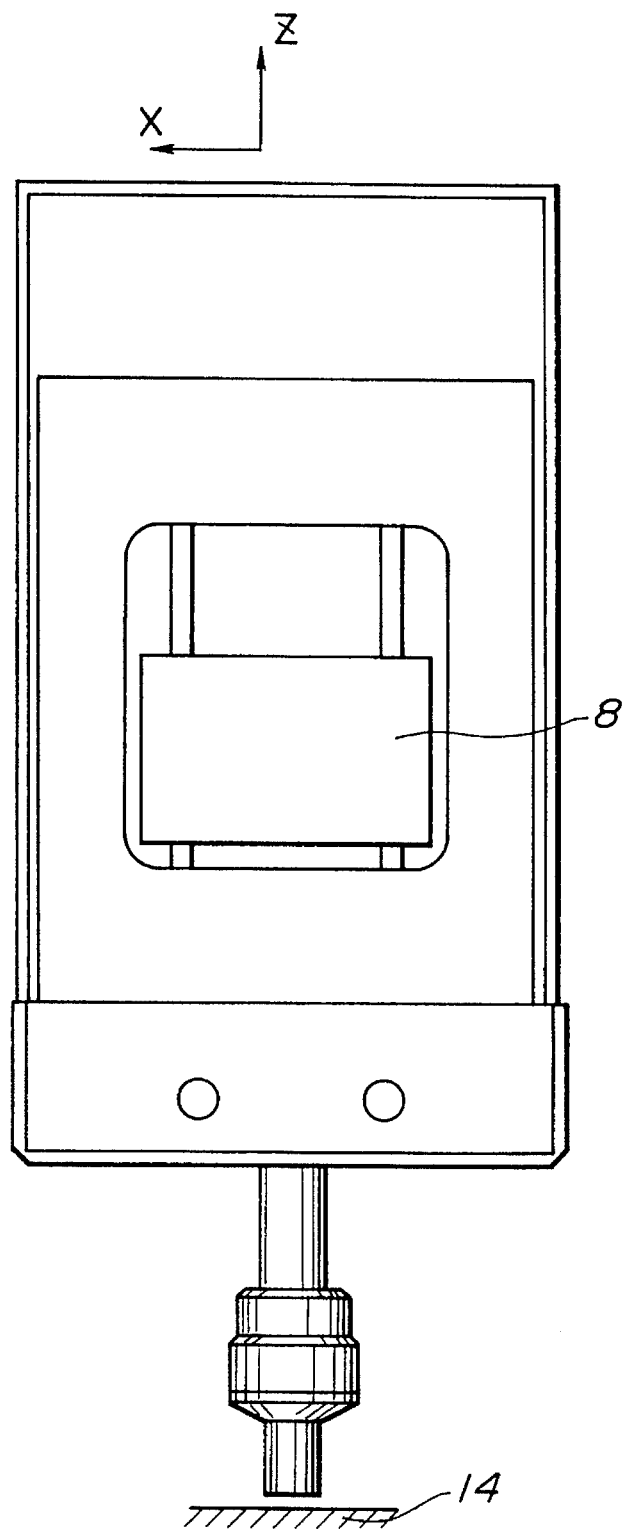
FIG. 10 is a bottom view of the displacement detecting apparatus of FIG. 7.

In this embodiment, a single bobbin 6 is used in a manner to be fixedly secured to the lift bar 5 which is in turn fixedly secured to the scale 4. The coil 7 is disposed or wound around the core portion of the bobbin 6. The two support members 10, 10 are disposed in such a manner that the bobbin 6 is put between them. The balance weight 8 of this embodiment is generally U-shaped in cross-section so as to be formed with a groove (not identified) inside which core portion (on which the coil 7 is disposed) of the bobbin 6 and the actuator 9 are located. The two opposite end portions of the balance weight 8 are respectively fixed to the opposite end portions of tile bobbin 6. In FIG. 9, the reference numeral 15 designates tile center of support of the two support members 10, 10 and the center of the coil 7.

In this configuration, the center of driving force of the actuator 9 is determined. An arrangement is so made that the center of support of the two support members 10, 10 coincides with the center of driving force of the actuator 9 at a position indicated by the reference numeral 16 in FIG. 9. Further, the weight of the balance weight 8 is suitably adjusted so as to cause the center of gravity of the whole moving body M to coincide with the center of support of the support members 10 and with the center of driving force of the actuator 9.

Thus, when the actuator locates the whole moving body M in the direction opposite to the measured surface 14, a moment around the support center of the support member 10 can be prevented from being produced. This effectively improves the response speed during location of the moving body M or a response frequency characteristics of the displacement detecting apparatus.

While a so-called astigmatism method has been shown and described to obtain the focus error signal in the above embodiments, it will be understood that this method may be replaced with a so-called critical angle detecting method or a so-called knife-edge method to obtain the same signal. In any one of the above methods, a control is so made as to render the focus error signal a zero value, and therefore the displacement can be effectively detected even though the reflection factors of the measured surfaces are different from each other.

It will be appreciated that an original point may be formed on the scale 4, by which the amount of the displacement can be effectively detected upon setting the original point at a standard position.

What is claimed is:

1. A displacement detecting apparatus with an object lens system for focusing a laser beam on a measured surface of an object and a detecting optical system for detecting a focus error signal which represents a difference between a distance of said object lens system from said measured surface and a focal distance of said object lens system, in accordance with a reflected light from said measured surface, the detecting optical system producing an output signal representative of said difference, said apparatus comprising:

an actuator means for moving said object lens system in a direction of an optical axis of said object lens system to cause said object lens system distance to coincide with said focal distance, in accordance with said output signal from said detecting optical system;

a linear scale disposed coaxial with said optical axis and connected to said actuator means;

a moving body including said scale, said moving body being movable with said object lens system;

a support member for supporting said moving body; and means for causing a center of gravity of said moving body, the center of driving force of said actuator means and the center of support of said support member to coincide with each other.

2. A displacement detecting apparatus as claimed in claim 1, wherein said causing means includes a balance weight connected to said moving body to adjust the center of gravity of said moving body so that the center of gravity of said moving body coincides with the center of driving force of said actuator means and with the center of support of said support member.

3. A displacement detecting apparatus as claimed in claim 1, wherein said actuator means includes first and second actuators which are located opposite to each other in a manner that said moving body is put between said first and second actuators.

4. A displacement detecting apparatus as claimed in claim 1, wherein said support member includes first and second members which are located opposite to each other in a manner that said moving body is put between said first and second support members.

5. A displacement detecting apparatus as claimed in claim 1, wherein said support member includes first and second support members which are located opposite to each other in a manner that said moving body is put between them.

\* \* \* \* \*